United States Patent [19]

Cienfuegos

[11] Patent Number: 5,044,592
[45] Date of Patent: Sep. 3, 1991

[54] ADJUSTABLE SEAT FOR BICYCLES AND THE LIKE

[76] Inventor: Henry Cienfuegos, P.O. Box 2365, La Puenze, Calif. 91746

[21] Appl. No.: 480,796

[22] Filed: Feb. 16, 1990

[51] Int. Cl.$^5$ ............................................. B62J 1/00
[52] U.S. Cl. .................................... 248/408; 297/195
[58] Field of Search ....................... 248/408, 409, 407; 297/195; 403/109

[56] References Cited

U.S. PATENT DOCUMENTS 2,644,504  7/1953  Vicky .................................. 403/107
4,150,851  4/1979  Cienfuegos ..................... 248/408 X Primary Examiner—Alvin C. Chin-Shue
Attorney, Agent, or Firm—Julius Rubinstein

[57] ABSTRACT

A replacement unit for a conventional bicycle which can be installed without modifying the bicycle requires the original seat and seat shaft to be taken out of the bicycle frame and replaced by the replacement unit. This unit comprises a tube which fits inside the vertical tubular bicycle frame. Inside the tube is a coil spring and a shaft. The coil spring is compressed by the weight of the shaft, and the weight rider sitting on the seat. When the rider places his weight on the pedals, the spring inside the tube lifts the seat. A plurality of stop members are disposed along the shaft and a pin is positioned to engage the stop member to lock the seat at the correct height above the frame, depending on the needs of the driver.

3 Claims, 2 Drawing Sheets

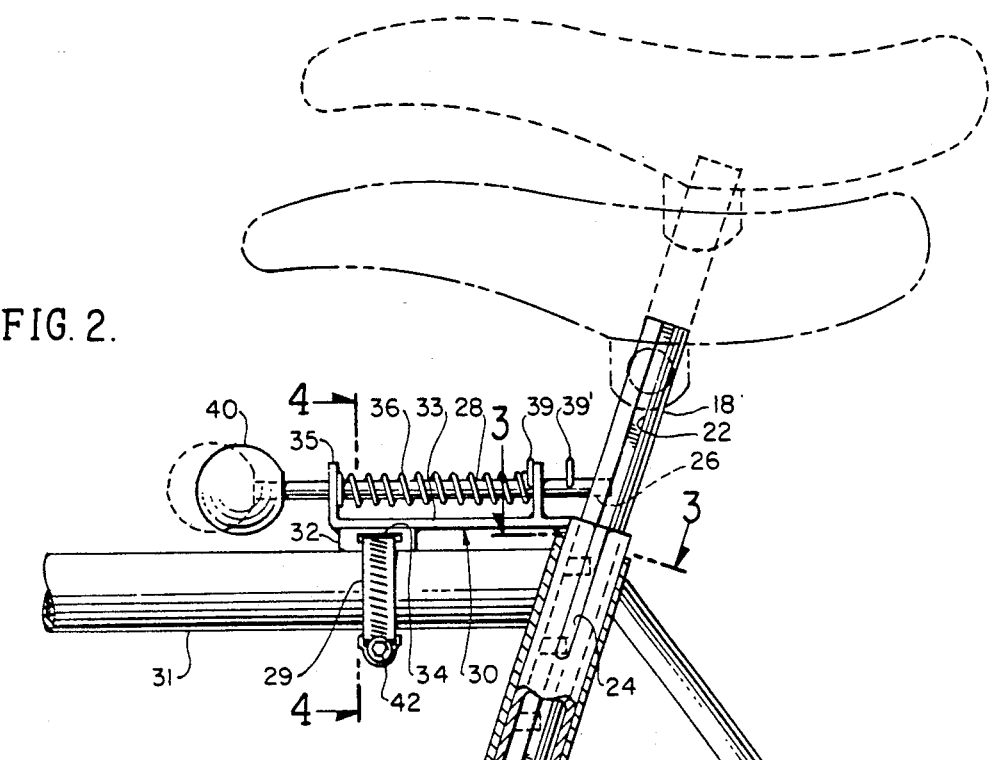
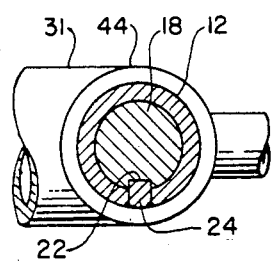
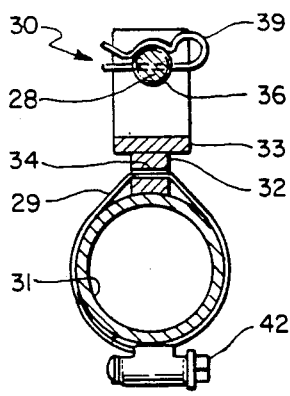
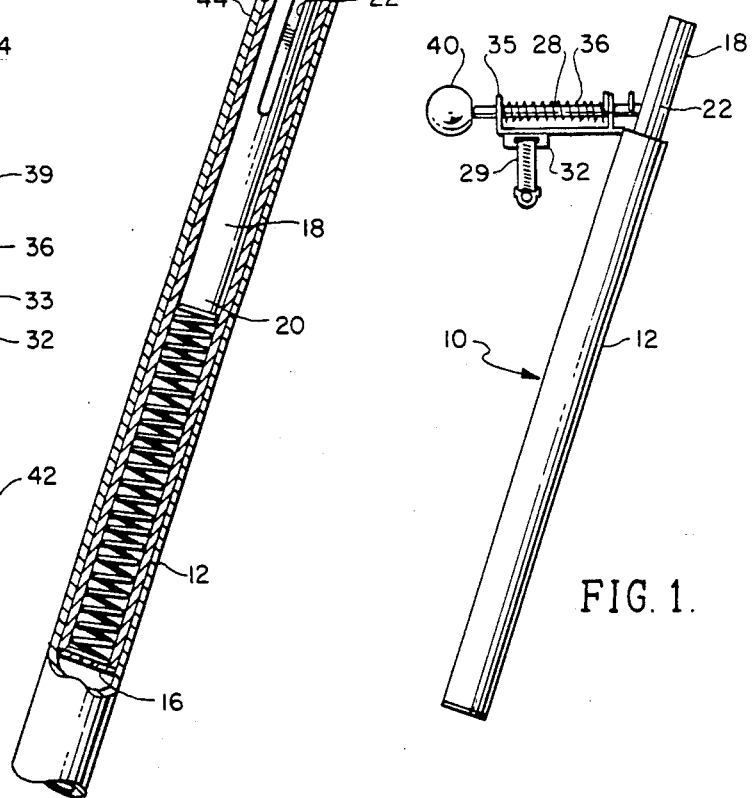

ADJUSTABLE SEAT FOR BICYCLES AND THE LIKE

This invention relates to an adjustable seat for bicycles, motorcycles, exercycles and the like.

BACKGROUND AND BRIEF SUMMARY

Heretofore, as exemplified by the patents to Cienfuegos, U.S. Pat. No. 4,150,851, British, Lurkings #21,497, Danish #53494, Riess, U.S. Pat. No. 510,993, Italian 617,928, Hinrichs, U.S. Pat. No. 3,350,120, Vick 2,644,504, and Forney #2,415,479, attempts have been made to make bicycle seats adjustable in height to accommodate different size riders.

Currently bicycle seats are made adjustable by attaching a shaft onto the bottom of the seat and inserting it in the hollow frame, in manner well known in the art. The seats are held in position by means of set screws which engage the shaft. However, it is awkward to readjust the position of the seats. The prior spring actuated devices for changing the height of the sea required the bicycle frame to be redesigned and parts welded to the bicycle frame to install the adjusting spring actuated unit. However since bicycles are made on an assembly line, manufacturers are reluctant to redesign the bicycles for this purpose because of the cost involved. Besides there are millions of bicycles in current use, with conventionally adjustable seats but the owners lack the tools for making the required changes. These bicycle owners offer a potential marke for this invention because persons who have bicycles may want the seats made easily adjustable without making structural changes in the bicycle frame.

What is needed therefore and comprises an important object of this invention is to provide an adjustable seat replacement for the conventional bicycle frame which can be substituted for the existing conventional seat and seat shaft without requiring any structural modification to the existing bicycle frame and thus permit the height of the seat above the frame to be easily adjusted by activating a spring biased plunger.

Basically, this invention comprises a seat height adjusting unit comprising a spring loaded seat shaft and a manual plunger locking device. To install the self adjusting seat of this invention it is only necessary to remove the conventional seat and its shaft, and replace it with the adjustable seat unit described below. No welding or other modification of the bicycle frame is necessary. Owners of bicycles or exercycles can easily and quickly replace their bicycle seats and shafts with the adjustable unit described below.

What is needed therefore and comprises an important object of this invention is to provide a unit comprising a seat and adjustable shaft, which can be inserted inside the tubular frame of the bicycle in place of the usual shaft presently mounted in the tubular frame so the height of the seat can be adjusted.

These and other advantages of this invention will become more apparent when better understood in the light of the accompanying drawings and specification wherein:

FIG. 1 is a side elevational view of the complete adjustable shaft unit without the bicycle seat mounted at its top.

FIG. 2 discloses an elevational view partly in section, showing the seat adjusting unit mounted inside the generally vertical tubular frame of the bicycle.

FIG. 3 is a sectional view taken on the line 3—3 of FIG. 2.

FIG. 4 is a sectional view taken on the line 4—4 of FIG. 2.

Figure 5:
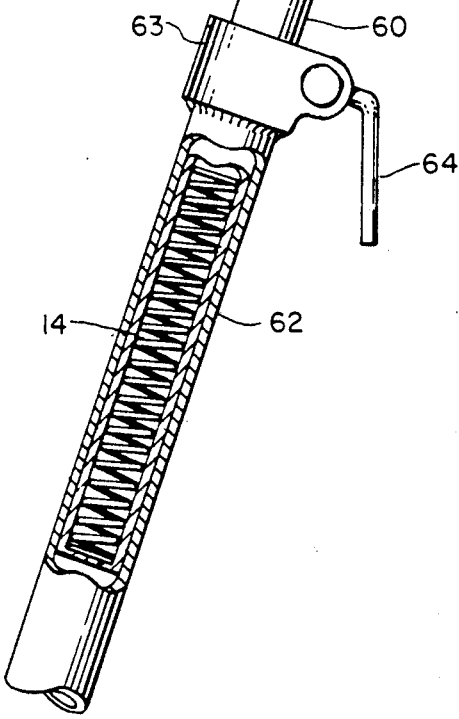

FIG. 5 discloses an alternate embodiment of a seat adjusting unit adaptable for mounting on an exercycle or a girls bicycle.

Figure 6:
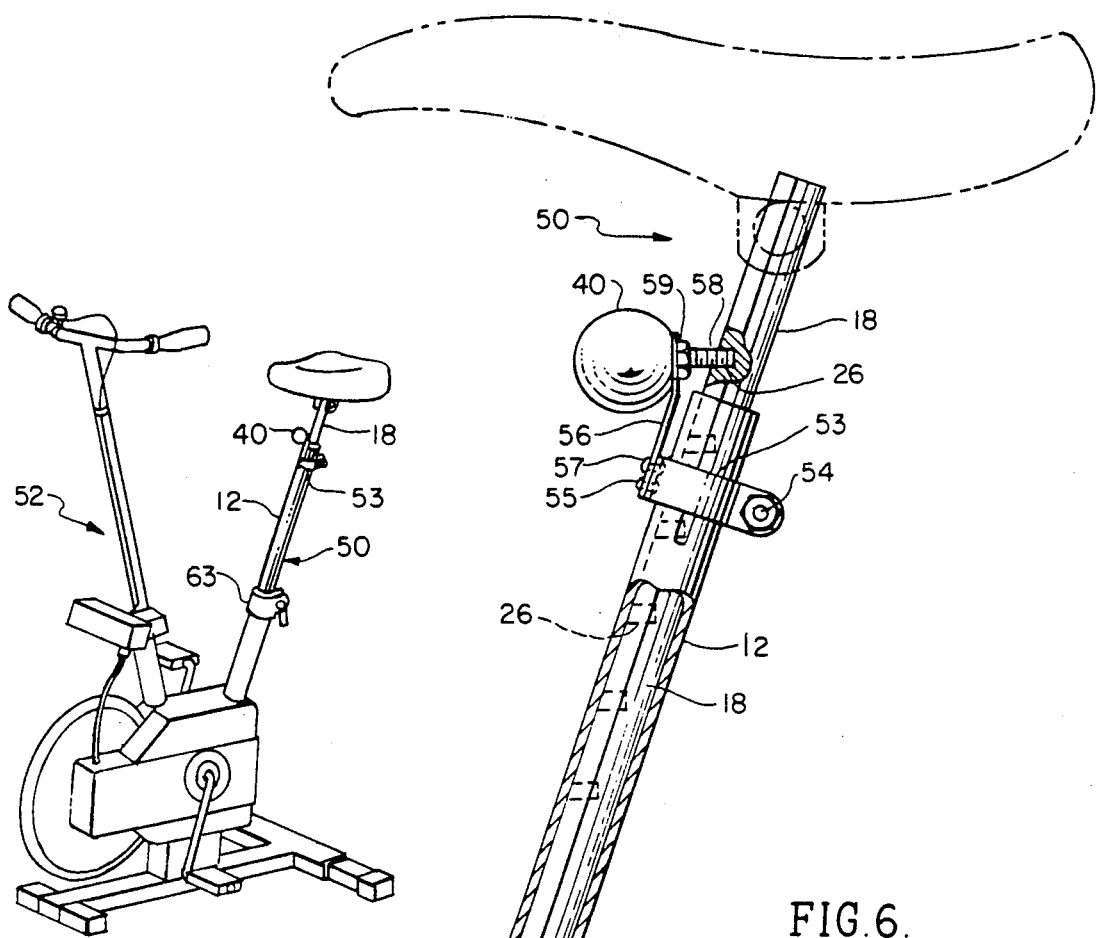

FIG. 6 discloses an elevational view partly in section of the alternate embodiment.

Referring now to FIG. 1 of the drawing, an adjustable replacement unit for a conventional bicycle, or exercycle seat and the like is indicated by the reference numeral 10. The unit 10 comprises an outer cylindrical tube 12 which is sized to enter the generally vertical tubular frame 44 of the bicycle shown in FIG. 2 a coil spring 14 mounted inside the outer tube 12, a spring biased plunger 28 and a stop washer 16 welded to the lower end of the tube 12 on which the bottom end of a coil spring 14 rests. An inner shaft 18 is mounted inside the outer tube 12 and its base 20 rests on the upper portion of the coil spring 14.

An inner shaft alignment groove 22 is formed in the inner shaft 18 and extends to the top of the inner shaft. A key 24 is welded to the outer surface of the outer shell 12 and is dimensioned so it slides within the groove 22 thus preventing the shaft 18 from rotating for reasons to be described below. The alignment groove extends toward the base 20 of the shaft. The shaft 18 is provided with a plurality of uniformly spaced vertically aligned height adjusting holes 26 dimensioned to receive the end of the locking pin 28. The locking pin 28 is maintained in its relative position to enter the adjusting holes 26 because the key 24 is engaged in the groove 22 of the shaft 18 thus preventing any misalignment of the end of the pin 28, and the height adjustment holes 26.

The outer tube 12 extends inside the conventional bicycle frame tube 44 after the conventional seat shaft has been removed. It is important to note that the shaft 18 extends above the outer tube 12 and the open top of the generally vertical frame tube 44, as seen in FIG. 2 thus exposing the adjusting holes 26 to enable the locking pin 28 to enter the adjusting holes 26 in the inner shaft above the bicycle frame. In this way, no modification of the bicycle frame is required.

In the embodiment shown in FIG. 2, a circular adjustable clamp 29 surrounds the horizontal bicycle frame portion 31. This clamp is made of a spring like strip of metal and can be adjusted to tightly embrace the horizontal bicycle frame 31 by means of a conventional bolt and nut 42.

A horizontal bracket 30 comprising a base member 33 and upward extending flanges 35 at each end of the base member 33 is mounted on the horizontal bicycle frame 31 in this particular embodiment. The second bracket 30 has a keel like member 32 extending downwardly from the base member 33 of the bracket 30. This keel like member has a slot 34 extending therethrough. In this manner the bracket 30 is secured to the horizontal bicycle frame 31.

A coil spring 36 is mounted between the upwardly extending flanges 35. One end of the coil spring engages a flange 35 and the other end of the coil spring 36 engages a spring cotter pin 39 which embraces the locking pin 28. A similar spring cotter pin 39' restricts the travel of the locking pin 28 when the knob is pulled out.

In assembly, the seat and the conventional seat shaft are removed from the generally vertical portion of the tubular bicycle frame 44 and outer tube 12 and the inner shaft 18 are inserted in its place. The metal strip clamp 29 is inserted through the slot 34 of the keel like member 32 and is tightened to the horizontal bar 31 of the bicycle frame. The locking pin 28 extends through openings in the flanges 35 and through the coil spring 36, one end of which is retained by to the cotter pin 39. A knob 40 is attached to the end of the locking pin 28 and when the knob 40 is pulled back, the opposite end of the locking pin is pulled out of the adjusting hole 26 in the shaft 18, thus allowing the spring 14 inside the tube 12 to push the shaft 18 upward exposing another vertically spaced adjusting hole 26 in shaft 18. To adjust the height of the seat, the rider stands on the pedals of the bicycle removing his weight from the seat, pulls out knob 40 allowing the bicycle seat to raise to the riders most comfortable position and then releases the knob 40 allowing the locking pin 28 to insert itself into the nearest hole 26 in the shaft 18 at the adjusted height.

In this way the conventional seat and shaft on current bicycles can be quickly and easily replaced by the easy-to-use seat adjusting unit 10.

The bicycle in FIG. 2 is a conventional bicycle, but the principles of this invention can be applied to exercycles or girls' bicycles, or other equipment which does not have a frame with a horizontal bar 31 upon which the bracket 30 is attached.

To adapt the unit 10 to this type of construction, an alternate embodiment 50 is shown in FIG. 5 as attached to an exercycle 52. A collar 53 is slidably mounted on the outer tube 12 after the removal of bracket 30 and clamped tightly by bolt and nut 54. One end 55 of a flat spring 56 is secured to the collar 53 by rivets 57. The opposite end has the knob 40 attached to it by means of a stud 58 and nut 59. The opposite end of stud 58 is shaped to enter one of the height adjusting holes 26 thus anchoring the shaft 18 to the outer tube 12. The lower end 60 of the seat adjustment unit 50 slips into the vertical tubular frame 62 of the exercycle 52 and therein is immovably secured by the split collar 63 and the bolt assembly 64, which is the conventional means of clamping the seat support shaft on this equipment.

To adjust the height of the seat, the rider pulls the knob 40 to disengage the stud 58 from the hole 26, and thus allows the compression spring 14 to raise the shaft 18 and its seat to the desired height.

Having described the invention what I claim as new is:

1. A mechanism for adjusting the height of a seat on a bicycle, said bicycle having a frame comprising at least a vertical tubular portion and a horizontal portion, a tube, said tube sized to fit inside said vertical tubular portion of the frame, a shaft mounted inside said tube, biasing means for exerting force on said shaft to urge it in a direction toward the top of said vertical tubular portion, said shaft having spaced pin receiving openings, a circular collar surrounding and tightly attached to said horizontal portion of the frame, a bracket, said bracket having a base portion and upstanding flanges at each end of said base portion, a keel like member formed at the base of said bracket extending downward to the surface of said horizontal portion, a slot formed in said keel like member, said circular clamp extending through said slot and around said horizontal portion of said frame to tightly secure said bracket to said horizontal portion of said frame, a coil spring positioned between said upwardly extending flanges of said bracket, a locking pin extending through openings in said flanges in said bracket and through the center of said coil spring, one end of said coil spring engaging one of said flanges of said bracket, means securing the opposite end of said coil spring to said locking pin, a knob, said knob attached to the end of the locking pin, whereby when the knob is pulled back, the locking pin is disengaged from the pin receiving openings in said shaft and the coil spring is compressed so that the rider of the bicycle can by standing on the pedals vary the weight on the seat, so that the seat will move up or down, until the rider is satisfied with the height of the seat and releases the knob permitting the locking pin to enter one of the pin receiving openings.

2. The mechanism described in claim 1 wherein said locking pin has a hole extending therethrough, a cotter pin extending through said hole and said spring to lock the locking pin to said coil spring.

3. The mechanism described in claim 2 wherein a second cotter pin positioned outside said bracket is secured to said locking pin to restrict the travel of the locking pin when the pin is pulled out.

* * * * *